No. 776,798. PATENTED DEC. 6, 1904.
A. RAICHE.
MACHINE FOR TYING SHOE UPPERS.
APPLICATION FILED DEC. 31, 1900.
NO MODEL. 5 SHEETS—SHEET 2.
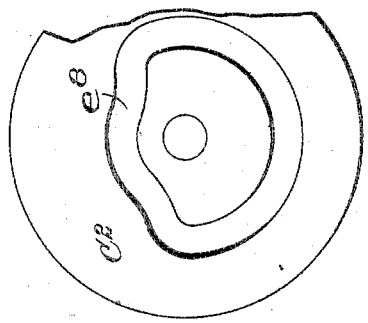
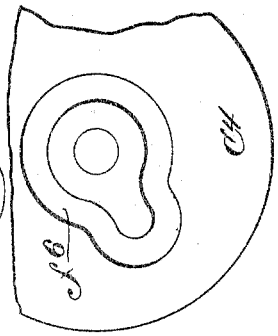
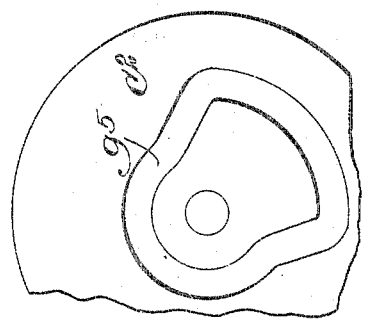
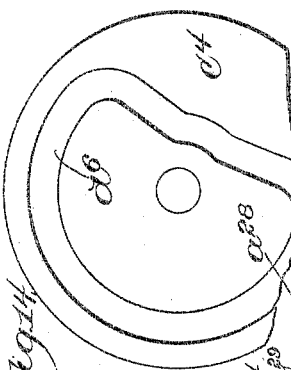
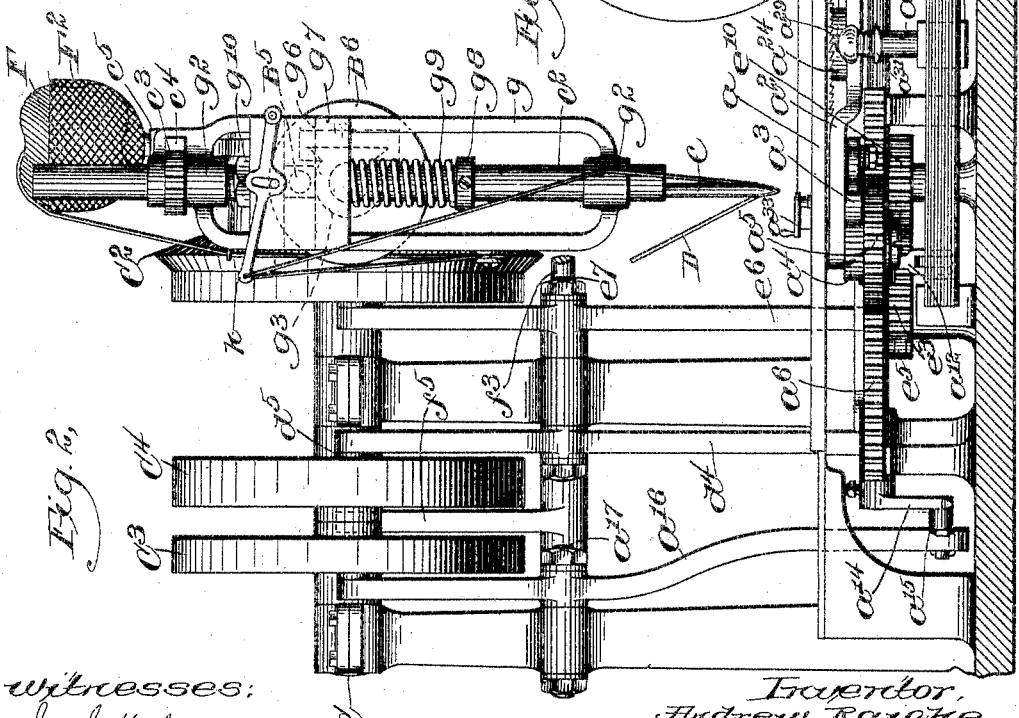

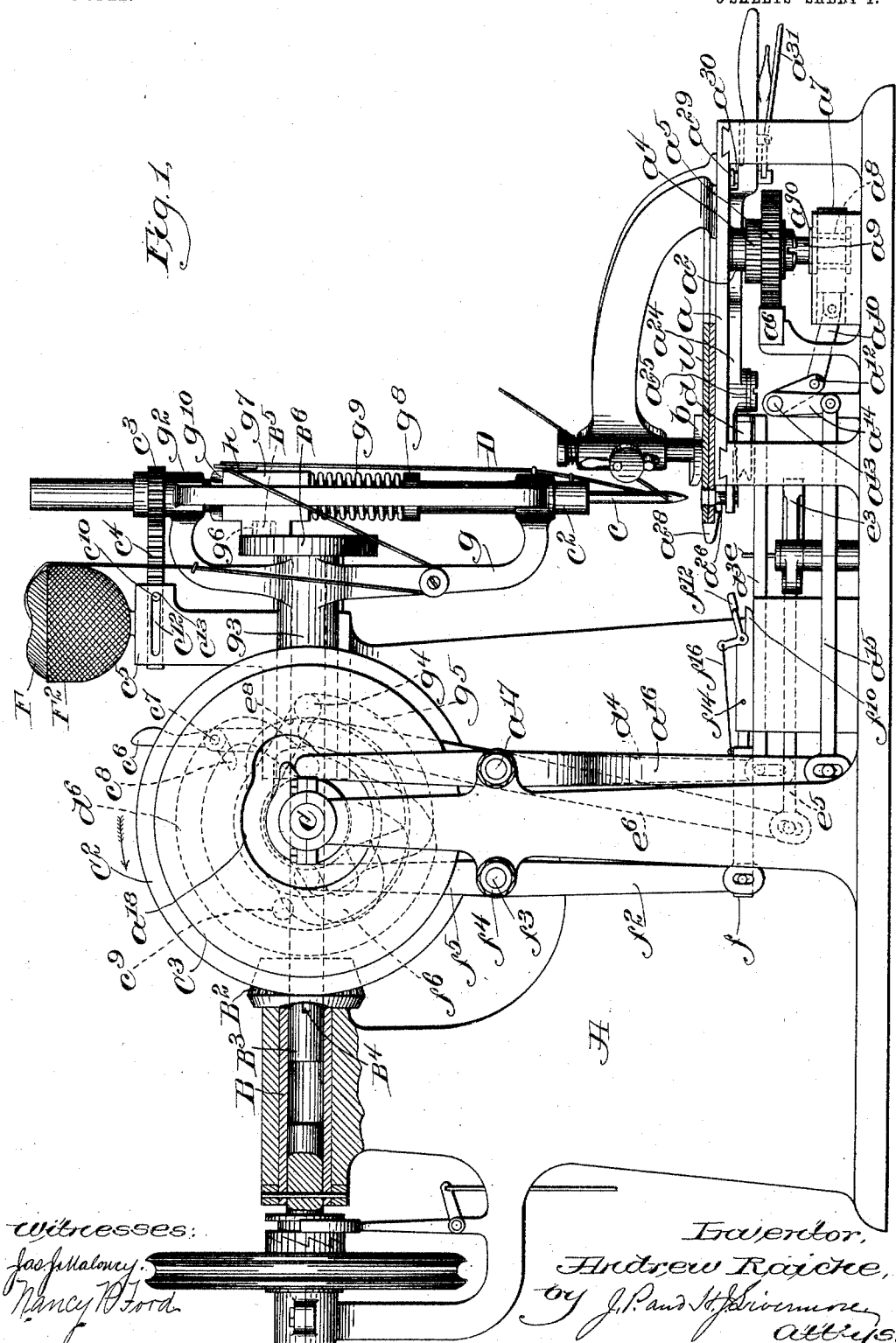

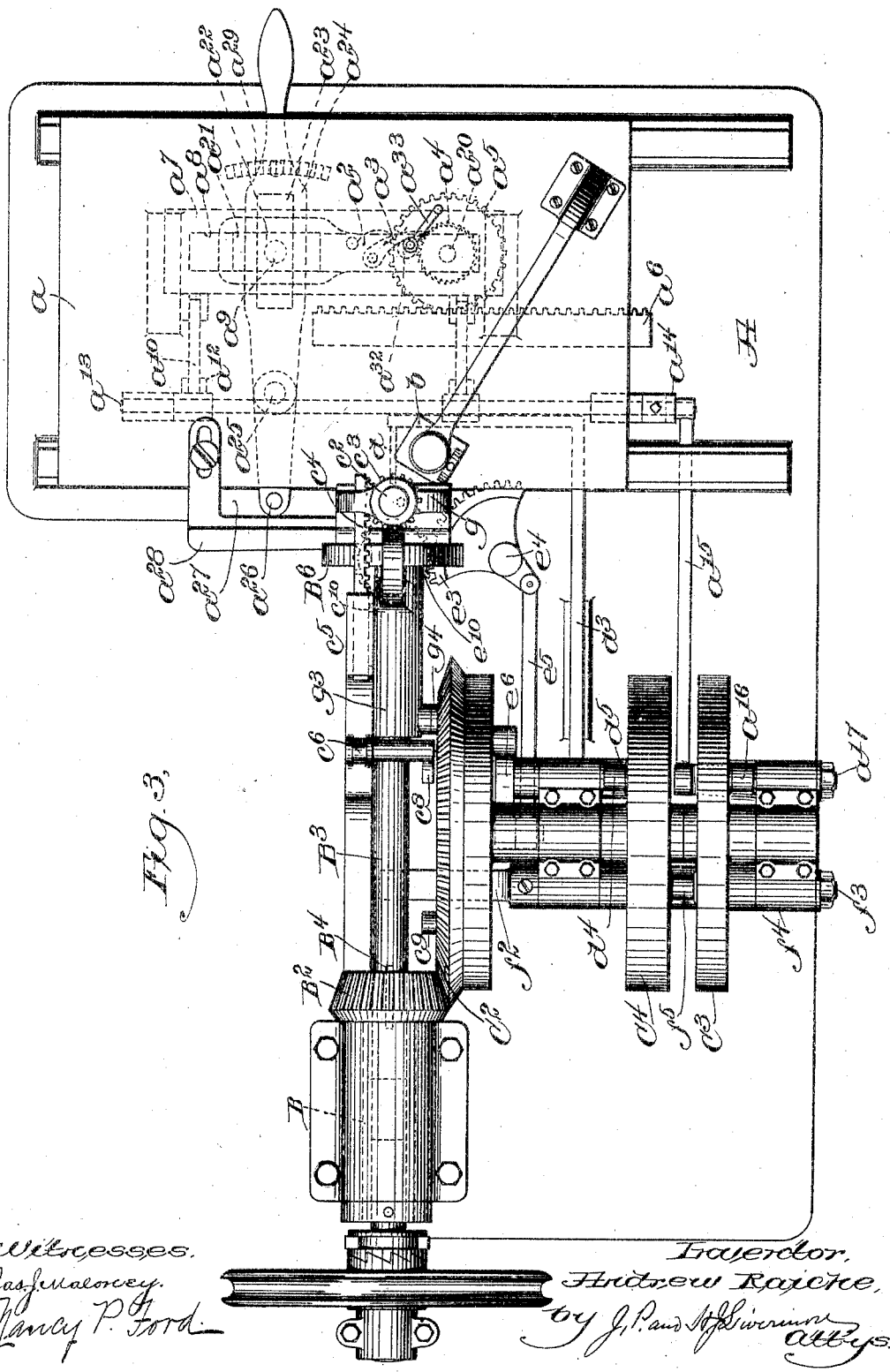

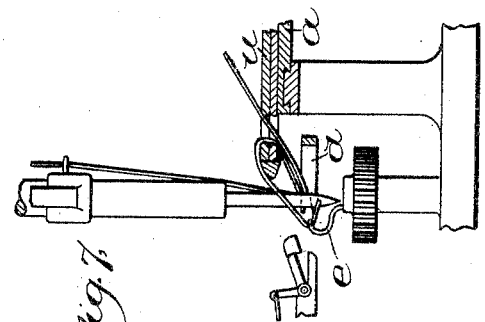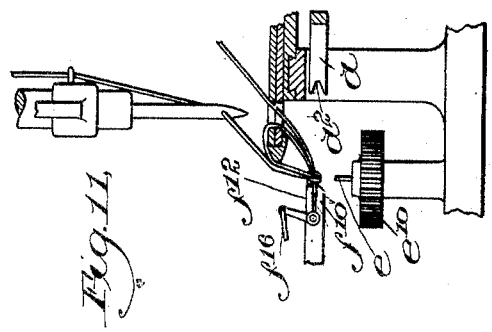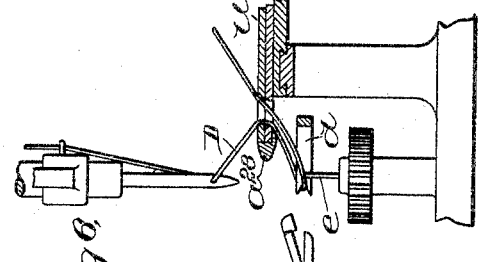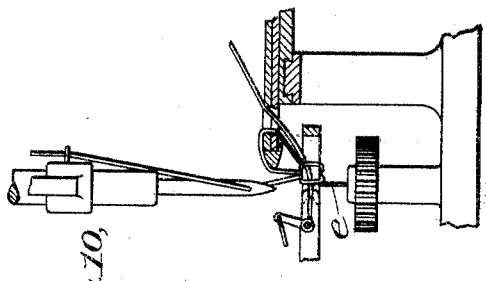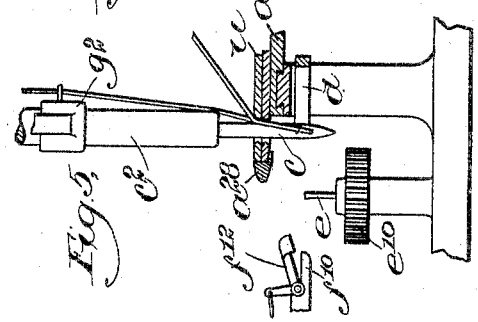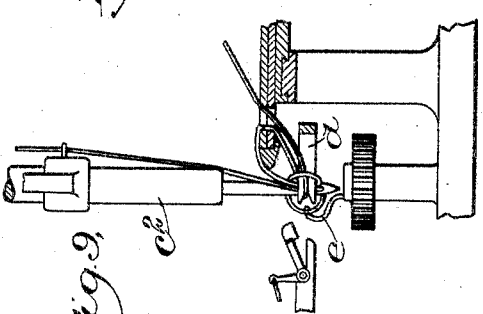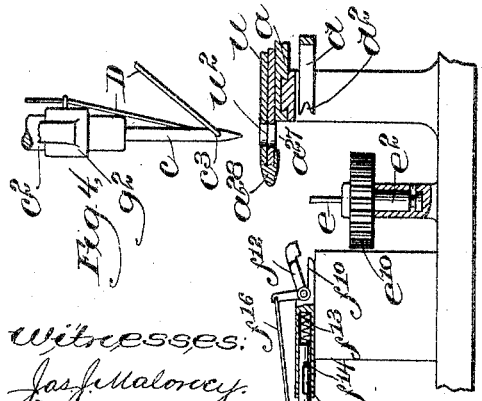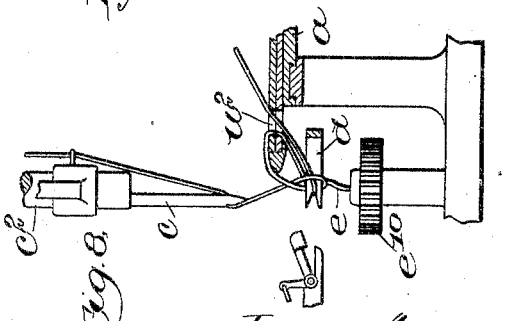

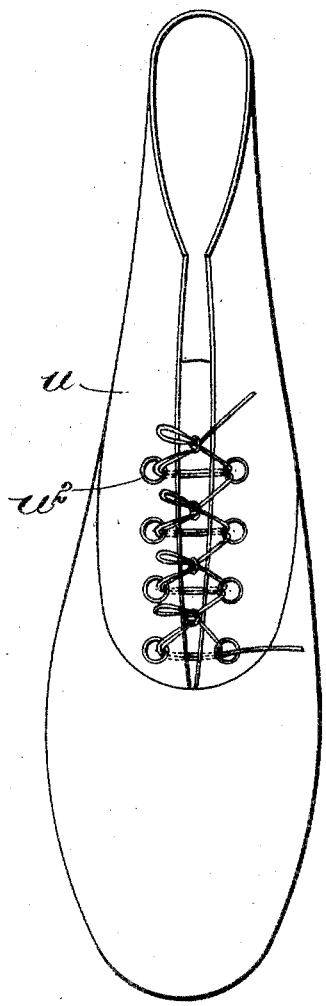

No. 776,798. Patented December 6, 1904.

UNITED STATES PATENT OFFICE.

ANDREW RAICHE, OF WOLLASTON, MASSACHUSETTS.

MACHINE FOR TYING SHOE-UPPERS.

SPECIFICATION forming part of Letters Patent No. 776,798, dated December 6, 1904.

Application filed December 31, 1900. Serial No. 41,603. (No model.)

*To all whom it may concern:*

Be it known that I, ANDREW RAICHE, of Wollaston, county of Norfolk, and State of Massachusetts, have invented an Improvement in Machines for Tying Shoe-Uppers Prior to Lasting, of which the following description, in connection with the accompanying drawings, is a specification, like letters on the drawings representing like parts.

The present invention relates to a machine for fastening together or tying the two parts of a shoe-upper before the shoe is lasted.

In lasting shoes it is necessary to connect together the two sides of the upper, this being done by lacing or tying cords through the eyelet-holes, an operation which has commonly been performed by hand and one which involves a great deal of time and expense. Certain fastening devices have been devised for the purpose, but no satisfactory results have been obtained, owing to the fact that when such devices are used the uppers are held at a uniform distance apart without opportunity to yield in conforming to the last, it having been found practically necessary to use a lacing or cord of some kind to hold the two sides of the upper together in such a manner that they may yield properly in the lasting operation.

The present invention is embodied in a machine which is adapted to tie the uppers together, a cord being used for the purpose and manipulated by a plunger or needle, through which the cord is threaded in such a manner as to perform a continuous operation, tying a knot at each pair of eyelets in the shoe-upper, and leaving sufficient slack for the two sides of the upper to yield during the lasting operation.

The machine embodying the invention comprises a feeding device for an upper, folded so that the eyelets on opposite sides are in line with each other, a twine-carrier which is substantially like a needle and will be hereinafter referred to as a "needle," a guide beyond the feeding device around which the tying-loops are formed, a twine catcher and looper to coöperate with the needle in forming each knot, and a tightener to coöperate with the needle in drawing each knot tight after it has been formed. For convenience the twine-carrier and twine will be hereinafter referred to as the "needle" and "thread." In the operation of the machine the needle has six reciprocating movements in the formation of each knot, (three forward and three return,) the first forward or downward movement carrying the thread through the eyelet-holes, after which the said thread is acted upon by the thread-catcher and moved out from under the eyelet-hole, while the second and third downward movements of the needle carry the thread downward at another point, the needle having made a lateral movement in the meanwhile, these movements of the needle completing the knot, with the assistance of the thread-catcher and the looper. Incidentally the needle has a second lateral movement which takes place between the second and third downward movements, whereby the lateral plane of movement of the needle is shifted with relation to the thread-catcher, this second lateral movement being preferably performed by rotating the needle-carrier, the needle being eccentrically set with relation thereto. In forming the knot the thread-catcher coöperates with the bight or loop formed in the first downward movement of the needle, and in the subsequent movements of the needle the thread is carried downward, first on one side of the said bight, positioned by the thread-catcher, and then on the opposite side thereof, the looper acting upon the body of the thread to throw the same around the thread-catcher to the side opposite the needle, so that in the two operations of the needle and the looper a double loop is formed around the bight, which bight is then seized by the tightener and the two loops drawn taut around the same by the upward pull of the needle and the lateral pull of the material in the feed movement thereof.

Figure 1 is a side elevation, parts being broken away and shown in section, of a machine embodying the invention; Fig. 2, a front elevation, partly in section, of the same; Fig. 3, a plan view; Figs. 4, 5, 6, 7, 8, 9, 10, and 11, details showing the position of the parts during each of the several steps which go to make a complete knot; Figs. 12, 13, 14, and 15, details showing the several cams separately, and Fig. 16 a perspective view of an upper the sides of which have been fastened together ready for lasting.

The members of the upper $u$ which are to be tied together are folded so that the eyelets on one side are in line with the corresponding eyelets on the other side, and the said members are then placed upon a feed-table $a$, upon which they are held by means of a presser-foot $b$ of any suitable construction, the said feed-table and presser-foot being movable with relation to the needle $c$, the movement taking place after each knot is completed, so that the said needle in its next downward movement will pass through the next pair of eyelets of the series. Without for the present considering the actual operation of forming the knots it may be stated that while eyelets in shoe-uppers are commonly set a uniform distance apart the distances vary in different uppers, and one feature of the present invention is embodied in novel means for varying the feed movement so that uppers having the eyelets differently spaced can be operated upon without elaborate readjustment of the machine. As herein shown, the step-by-step movement of the table $a$ is performed through the agency of a lever $a^2$, which is pivotally connected at $a^{20}$ with the under side of the table $a$ and provided with a pawl $a^3$, adapted to coöperate with a ratchet-wheel $a^4$, which rotates on an axis concentric with that of the pivotal support of the said levre $a^2$. The said ratchet-wheel carries a pinion or gear-wheel $a^5$, which meshes with a stationary rack $a^6$, it being obvious, therefore, that if the said pinion is rotated it will cause the feed-table to travel along with relation to said rack, thus producing the required feed movement. The pawl $a^3$ is normally held in engagement with the ratchet-wheel by means of a spring, and in order to return the table to its starting-point after a complete tying operation said pawl is arranged to be manually released, as by a cam or eccentric $a^{32}$, pivoted to the table and provided with a handle $a^{33}$.

The lever $a^2$ is arranged to be oscillated upon its pivot by means of a reciprocating member $a^7$, having a slot or channel $a^8$, adapted to receive a block $a^{90}$, into which extends a projection $a^9$, suitably connected with the lever $a^2$, it being obvious, therefore, that while a reciprocating movement of the said member $a^7$ will swing the lever the lever which is connected with the table is free to travel along the said slot or channel $a^8$, being actuated by the said member $a^7$ when in any position. The said member $a^7$ is shown as connected, by means of links $a^{10}$, with arms $a^{12}$ from the rock-shaft $a^{13}$, having an arm $a^{14}$, which is connected by a link $a^{15}$ with a lever $a^{16}$, the said lever being pivoted at $a^{17}$ and arranged to be acted upon by a cam-groove $a^{18}$, formed in the disk $c^5$, carried by a counter-shaft $c$, suitably geared to the main shaft B, said shafts being shown as provided with intermeshing bevel-gears $c^2$ and $B^2$. In order to vary the feed movement of the table, it is necessary only to vary the extent of movement of the lever $a^2$, which may be accomplished by shifting the point of connection between the said lever $a^2$ and the projection $a^7$. As herein shown, the said lever $a^2$ is provided with a slot $a^{21}$, containing a block $a^{22}$, which is pivotally connected with the projection $a^9$, the said projection also bearing in a similar block which fits a corresponding slot $a^{23}$ in a lever $a^{24}$, the movement of which lever $a^{24}$ is transverse to that of the lever $a^2$. The said lever $a^{24}$ is pivoted to the feed-table at $a^{25}$ and is provided at one end with the pin $a^{26}$, adapted to coöperate with one of the eyelet-holes, the parts being so arranged that if the first of the series of eyelet-holes is in line with the needle $c$ and the last of the series engaged by the said pin $a^{26}$ the proper feed movement will be obtained if the lever $a^{24}$ is in such position that the upper $u$ lies flat with the needle in the eyelet-hole at one end and the pin $a^{26}$ in the eyelet-hole at the other end. When, therefore, the lever $a^{24}$ is locked in the position determined in this way, the machine is ready to operate and will have the proper feed movement to cause the needle to enter an eyelet-hole after each movement of the feed-table. To lock the lever, the table is provided with a series of shoulders $a^{29}$, (preferably a ratchet-surface,) engaged by a spring locking member $a^{30}$, carried by the lever and having a releasing-handle $a^{31}$.

The operation of forming the series of knots whereby the members of an upper are connected together may be best understood by reference to Figs. 4 to 11, the movements of the several parts being for the present considered apart from the mechanical devices which cause such movements to be made at the proper intervals of time.

Referring to Fig. 4, the needle $c$, which is mounted upon an oscillating shaft or bar $c^2$ and provided with an eye $c^3$, in which the thread D is carried, first stands directly over a space $a^{27}$, formed between the edge of the feed-table $a$ and a guide or gage $a^{28}$, around which the thread is eventually tied, the said guide being connected with the table at one end only, the space $a^{27}$ being in the form of a slot or channel, so that the two parts of the upper, although tied together, are not in any way connected with the table, the slack of the loops being around the guide when the operation is finished and the tied upper then being slipped off endwise. One end of the thread or twine D comes from a suitable ball or skein F or other source of supply, Figs. 1 and 2, the other end being loose and held by the operator during the first downward movement of the needle, which then descends to the position shown in Fig. 5, carrying the loop through the two eyelet-holes $u^2$ in the upper $u$ which are in line with each other. The guide $a^{28}$ is shown as having a shoulder to gage the edges of the upper $u$. In descending the needle passes to one side of the thread-catcher $d$, which is shown as a reciprocating member having a notch $d^2$ at its end to catch the thread, the said thread-catcher then moving longitudinally to the position shown in Fig. 6, catching the thread at one side of the needle and carrying the same out from under the feed-table and guide $a^{28}$ in the form of a loop. In the meanwhile the needle rises and then moves laterally to the position shown in Fig. 6, so that in its next descending movement it will carry the thread outside of the guide $a^{28}$, whereby the main portion of the said thread will overlie the material, extending from the opening therein to the outer edge. As indicated in Figs. 6 and 7, therefore, the loop of thread passes through the eyelet-holes and under the material, while the end of the thread carried by the needle passes over the material, it being necessary, therefore, in order to secure the two parts of the material together merely to fasten the said needle-thread to the said loop. The thread-catcher $d$ remaining in the position shown in Fig. 6, the needle again descends in the same position relatively to the thread-catcher as before, and the thread between the needle and the upper part of the material is then acted upon by the looper $e$, which consists of a finger mounted on an oscillating shaft $e^2$, which is arranged to be turned half around at this period in the operation, thus catching the thread and throwing it around the thread-catcher, as indicated in Figs. 7 and 8, Fig. 7 showing the parts in the middle of this operation and Fig. 8 showing the parts after the operation has been completed and the needle again withdrawn. A single loop of thread is thus formed around the loop or bight which overlies the end of the thread-catcher, and to complete the knot it is necessary only to form another loop in the opposite direction, this being accomplished by the return movement of the looper $e$ coöperating with the thread carried down by the needle at the opposite side of the thread-catcher $d$, this operation being shown in Fig. 9 as partially performed. After rising to the position shown in Fig. 8 the needle must be given a slight lateral movement, so that when it next moves downward it will pass the thread-catcher $d$ at the opposite side, carrying the thread into such position as to be acted upon by the looper $e$ in its return movement, as described. This slight lateral movement may be conveniently provided for by turning the needle-shaft half around, the needle being shown as eccentric to the axis of said shaft, so that a half-rotation of the said shaft will sufficiently change the lateral position of the needle. Such half-rotation, furthermore, gives a slight twist to the thread, thus assisting in forming the loop, as well as shifting the thread from one side to the other of the looper, so that in the return movement of the said looper the proper strand will be picked up and thrown around the thread-catcher $d$ in the opposite direction to complete the knot, as shown in Figs. 9 and 10. At the end of these operations the thread-catcher $d$ recedes and the feed movement takes place, and in order to tighten the knot the bight originally formed by the thread-catcher is adapted to be seized by a gripper $f$ just prior to the movement of the thread-catcher $d$, the said gripper then remaining stationary, while the upward movement of the needle, together with the feed movement of the material, pulls the double loop tight around the bight formed by the thread-catcher, thus completing the knot. The material then having been moved to such a position that the next pair of eyelets lies under the needle, the operation is repeated, and so on until the two parts of the upper are completely fastened together. The guide $a^{28}$ in a way modifies the feed of the thread, so that the loops of thread between successive knots do not tightly bind the edges of the upper which they connect, and the two members of the upper when fastened together bear the proper relation to each other for a successful lasting operation, being securely but flexibly connected together at the right distance apart. The nature of the knots and the relative positions of the upper members when tied are shown in Fig. 16.

As herein shown, the needle-bar $c^2$ is mounted in bearings $g^2$ in a reciprocating spider or frame $g$, which is longitudinally movable with relation to the frame A, the shank $g^3$ of said spider being in the form of a sleeve having a projection $g^4$ which coöperates with a cam-groove $g^5$ in one face of the bevel-gear $C^2$, whereby a reciprocating movement of said spider and a corresponding lateral movement of the needle is produced, these movements being timed, as above described. The vertical movement of the needle is accomplished through the rotation of a shaft $B^3$, shown as bearing in the sleeve $g^3$ and projecting into the main shaft B, which is tubular, the shaft $B^3$ having a spline connection with said main shaft, so that it will rotate with the said shaft B, although free to move longitudinally with the spider $g$. A portion of the spline-groove is shown at $B^4$, Figs. 1 and 3. The shaft $B^3$ is provided with an eccentric pin or projection $B^5$, which is carried by a disk $B^6$ at the end of the said shaft, said pin entering a channel $g^6$ in a cross-head $g^7$, so that the rotation of the shaft causes a reciprocating movement of the cross-head, which is suitably connected with the needle-bar. To prevent damage in case the needle is arrested or impeded while the machine is operating, the needle-bar has a free bearing in the cross-head, but is provided with a shoulder or collar $g^8$, between which and the said cross-head $g^7$ is located a stiff spring $g^9$, there being another shoulder, $g^{10}$, above the cross-head, the spring being strong enough to keep the needle in the position shown relative to the cross-head during the normal operation of the machine. As has been described, the needle-bar makes three vertical movements up and down at each operation of forming a knot, changing its lateral position in the meanwhile. The gear $C^2$ on the counter-shaft C is therefore arranged to rotate once for every three complete rotations of the main shaft B, the cam-groove $g^5$ being so shaped as to produce a longitudinal movement of the shaft $B^3$ at the proper time, causing the said shaft then to dwell during the reciprocating movements of the needle. The said cam-groove is therefore, as shown in Fig. 12, arranged on the arcs of two diameters, about two-thirds being on the arc of one diameter and one-third on the arc of another, so that two of the vertical movements of the needle will take place in one plane and the third vertical movement thereof will take place in another plane. The cam-groove $a^{18}$, which operates the feed, is adapted to operate the lever $a^{16}$ once at each revolution of the counter-shaft C, so that the feed movement takes place after each complete knotting operation. It is further necessary, however, that a slight lateral movement of the needle should take place in a plane at right angles to that of the lateral movement performed by the instrumentalities above described. As has been stated, this second lateral movement is preferably accomplished by mounting the needle $c$ eccentrically with relation to the needle-bar $c^2$ and causing a half-rotation of said needle-bar at the proper point in the operation. As shown, the said needle-bar is provided with a spur-gear $c^3$, which meshes with a sliding rack $c^4$, adapted to travel in a guide $c^5$, which is parallel to the shaft $B^3$. The needle-bar $c^2$ is frictionally held in its bearings, so that in the lateral movement thereof the said rack will travel with the needle-bar without producing any rotation thereof unless it is positively moved. Thus as the needle-bar is carried laterally after its first downward movement the rack will travel therewith without producing any rotation of the said needle-bar, the said rack, however, being engaged prior to the third downward movement of the needle-bar by an arm or projection $c^6$, which is pivoted at $c^7$ and provided with a tail or projection $c^8$, which is in the path of a projection $c^9$, secured to the face of the gear $C^2$, so that as the said gear rotates the arm $c^6$ will be rocked upon its pivot and will (once during each revolution) engage the end of the rack, which has been moved toward the same in the lateral movement of the needle, thus causing the movement of said rack with relation to the needle-bar and producing a half-rotation thereof. To restore the needle-bar to its normal position prior to the formation of the next knot, the rack $c^4$ is shown as provided with a projection $c^{10}$, which extends into a slot $c^{12}$, one end of which forms a shoulder $c^{13}$ to arrest the said rack as the needle-bar moves laterally, so that such movement of the needle will produce a half-rotation of the needle-bar in the opposite direction, restoring the said parts to their normal positions, as shown in Fig. 1.

The thread-catcher $d$, which moves forward after the first downward movement of the needle and remains forward until the knot is finished, is shown as mounted on a slide $d^3$, which is connected with one end of a lever $d^4$, the opposite end of which has a cam-roll $d^5$ entering a suitable cam-groove $d^6$ in the disk $C^4$, connected with the counter-shaft C. The said cam-groove is so shaped (see Fig. 14) that the lever $d^4$ will be swung upon its pivot just after the needle descends for the first time, then dwelling during the subsequent operations of the needle, so that the thread-catcher will stand in the proper place for tying the knot and will then recede just prior to the first downward movement of the needle at the next operation.

The looper $e$, which makes a half-rotation first in one direction and then in the other after the second and third downward movements of the needle, is shown as operated by means of a segment $e^3$, pivoted at $e^4$, meshing with a pinion $e^{10}$, which carries said looper $e$, and connected, by means of a link $e^5$, with an arm or lever $e^6$, pivoted at $e^7$, said lever being arranged to be acted upon by a cam-groove $e^8$, also formed in one face of the beveled gear $C^2$. The shape of the said cam-groove is indicated in Fig. 13 and is such that at each complete cycle of operations the said segment will remain stationary for about one-third of the time and will then move in one direction during about one-third of the time, returning to its normal position during another third of the time, so that the looper will move back and forth, as hereinbefore described.

The gripper $f$, which seizes the loop formed by the thread-catcher in order to hold the thread while the knot is being tightened by the upward pull of the needle, is shown as a slide connected at one end with a lever $f^2$, which in turn is connected with the rock-shaft $f^3$, pivoted at $f^4$ and having an upwardly-projecting arm $f^5$, which is provided with a cam-roll coacting with a suitable cam-groove $f^6$ in one face of the disk $C^4$. The shape of the said cam-groove is best shown in Fig. 15. The said gripper comprises two members $f^{10}$ and $f^{12}$, pivotally connected together, the member $f^{10}$ being longitudinally movable with relation to the slide $f$, but normally held in the position shown in Fig. 4 by means of the spring $f^{13}$ and a retaining-pin $f^{14}$, which enters a slot $f^{15}$ in a projection from the said slide, the said member $f^{10}$ being shown as sleeved upon the said projection. The member $f^{12}$ is provided with an arm connected by a link $f^{16}$ with the said slide, it being obvious, therefore, that if the member $f^{10}$ is arrested while the slide still continues to move the member $f^{12}$ will be forced toward the member $f^{10}$, the two members thus forming a pair of nippers to catch the thread. The ends of the said members are forked, so as to straddle the end of the thread-catcher $d$, as indicated in Fig. 10, so as to grasp the thread on opposite sides of said thread-catcher and hold the same as indicated in Fig. 11 while the thread-catcher recedes and the needle rises.

While for convenience in the foregoing description the material used has been referred to as "thread" and the carrier $c$ as a "needle," the said plunger is not in the ordinary sense a needle or perforating device, but merely a carrier, and the material used would probably be ordinary twine. The feed of the twine is controlled by a tension $h$, which may be of any suitable construction, and the twine may be fed from a ball F, which is shown in Figs. 1 and 2 as contained in the cup $F^2$ at the top of the machine.

It is not intended to limit the invention to the specific construction and arrangement herein shown and described, since modifications may be made without departing from the invention.

I claim—

1. A machine for tying together perforated material, such as the two sides of a shoe-upper, comprising a needle; means for operating said needle to first carry the twine through said perforations and subsequently past the edges of the material beyond said perforations; a catcher to form a loop in the twine which has been carried by the needle through the perforations; and a looper to carry around said loop the twine which has been presented by the needle beyond the perforations.

2. A machine for tying together perforated material, such as the two sides of a shoe-upper, comprising a needle; means for operating said needle to first carry the twine through said perforations and subsequently past the edges of the material beyond said perforations; a catcher to form a loop in the twine which has been carried by the needle through the perforations; a looper to carry around the said loop the twine which has been presented by the needle beyond the perforations; and a gripper to hold the said loop while the knot is being tightened.

3. A machine for tying together perforated material such as the two sides of a shoe-upper, comprising a needle, means for operating said needle to first carry the twine through such perforations and subsequently past the edges of the material beyond said perforations; a catcher to form a bight or loop in the twine; a looper to carry around the said loop the twine which is presented by the needle beyond the perforations, and a feeding device for the material whereby the perforations are successively presented to the needle, as set forth.

4. A machine for tying together perforated material such as the two sides of a shoe-upper, comprising a needle; means for reciprocating said needle to carry the twine first through such perforations and subsequently past the edges of the material beyond said perforations; a catcher to form a bight or loop in the twine; a looper to carry around the said loop the twine which is presented by the needle beyond the perforations, a feeding device for the material whereby the perforations are successively presented to the needle; and means for adjusting the extent of feed movement, as set forth.

5. In a knot-tying machine, a needle; means for operating said needle to cause three forward and return reciprocating movements thereof at each knot-tying operation; a thread-catcher beyond the material to be tied adapted to catch the thread and form a loop therein at the end of the first forward movement of the needle; means for longitudinally moving said thread-catcher to form an extended loop; means for producing a lateral movement of the needle prior to its second and third forward movements to correspond to the longitudinal movement of the thread-catcher whereby the thread is carried past the loop; a looper to catch the thread and throw it around the loop formed by the thread-catcher prior to the second return movement of the needle; means for producing another lateral movement of the needle prior to its third forward movement to carry the thread to the opposite side of the thread-catcher and loop thereon, the looper aforesaid then moving in the opposite direction to form a second loop around the thread-catcher, as set forth.

6. The combination with a reciprocating needle, and means for operating said needle to carry the thread through the perforations in the material; of a thread-catcher to catch and form a loop in the thread in the return movement of the needle; means for producing a longitudinal movement of said thread-catcher to carry the said loop beyond the edge of the material; means for producing a lateral movement of the needle prior to the second reciprocating movement thereof to carry the thread past the edge of the material; and a looper acting upon the thread carried by the needle past the edge of the material to carry the said thread around the loop formed by the thread-catcher and thereby make a knot.

7. The combination with a reciprocating needle-bar; of a movable guide for said needle-bar to produce a lateral movement thereof without interfering with the reciprocating movement; a needle eccentrically mounted with relation to said needle-bar; means for rotating said needle-bar to change the lateral position of the needle; and devices coöperating with said needle to form a knot during three complete forward and return reciprocations thereof, as set forth.

8. The combination with a feed-support for the material to be tied, of a guide or gage for the edge of the material separated from said support; a needle having reciprocating and lateral movements to carry the thread below the feed-support, the first movement carrying it through the perforations and the subsequent movements beyond the guide or gage aforesaid; a thread-catcher below the feed-support to catch the thread after the first forward movement of the needle and to push the same beyond the guide or gage aforesaid; and an oscillating looper to throw the thread first in one direction and then in the other direction around the said catcher and the thread held thereby, as set forth.

9. The combination with a guide for the needle-bar, said guide being movable to carry the needle-bar in a lateral direction; of a rotatable shaft to produce a reciprocating movement of said needle, said shaft having a sliding connection with a gear or rotating device; a needle mounted eccentrically upon the needle-bar; a gear upon the said needle-bar; a rack meshing with said gear and carried by the movable guide for said needle-bar; and means for producing a longitudinal movement of said rack with relation to said guide to rotate said needle-bar, substantially as described.

10. In a machine for tying a series of knots, a needle having six reciprocating movements for each knot-forming operation; a thread-catcher operating after the first movement of the needle to catch the thread and adapted to move during the second movement to form a loop in the thread; means for producing a lateral movement of the needle prior to its third movement to correspond to the movement of the thread-catcher; a looper adapted to move in one direction at the end of the third movement of the needle, and in the other direction after the fifth movement of the needle; and means for producing a lateral movement of the needle in a direction transverse to the thread-catcher between the third and fifth movements of said needle, substantially as described.

11. In a machine for tying together two layers of material having adjacent openings or perforations, the combination with a device for passing a continuous thread first through a pair of adjacent openings and then over the edges of the material; of a thread-catcher or retaining device to form a loop in the thread passed through; and means for looping the thread passed over the edges of the material around the loop in the thread passed through the openings, whereby a knot is produced without breaking the continuity of the thread.

12. The combination with a support for two layers of material having adjacent openings or perforations; of means for passing a loop of thread through a pair of openings; a catcher for said loop adapted to push the same beyond the edge of the material; means for carrying two additional loops of the same thread past the edge of the material; and means for throwing said additional loops around the loop first formed, whereby a knot is produced without breaking the continuity of the thread.

13. In a machine for preparing shoe-uppers for lasting, the combination with feed mechanism for the uppers; of means for passing twine first through the eyelets to form a loop, and then around the edges; and means for looping the thread passed around the edges over the loop formed in the thread passed through the eyelets to produce a knot for each pair of eyelets without breaking the continuity of the thread.

In testimony whereof I have signed my name to this specification in the presence of two subscribing witnesses.

ANDREW RAICHE.

Witnesses:
   HENRY J. LIVERMORE,
   JAS. J. MALONEY.